United States Patent [19]
Olson et al.

[11] Patent Number: 5,581,480
[45] Date of Patent: Dec. 3, 1996

[54] METHOD AND APPARATUS FOR MIXING MULTIPLE CHANNELS OF SAMPLED DIGITAL AUDIO USING A NON-LINEAR CLIPPING FUNCTION

[75] Inventors: Kipley J. Olson, Redwood City; James D. Reekes, San Jose; Samuel C. Dicker, Santa Cruz, all of Calif.

[73] Assignee: Apple Computer, Inc., Cupertino, Calif.

[21] Appl. No.: 241,078

[22] Filed: May 10, 1994

[51] Int. Cl.⁶ ................................................. G06F 17/00
[52] U.S. Cl. ................................................... 364/514 R
[58] Field of Search ...................... 364/514 R; 395/2.87, 395/154; 381/29, 30, 106; 84/625, 645

[56] References Cited

U.S. PATENT DOCUMENTS 4,704,726  11/1987  Gibson ..................................... 381/106
4,924,121   5/1990  Ohno ....................................... 307/542

OTHER PUBLICATIONS

Black; "Computer Networks" Prentice Hall (N.Y.) 1987; pp. 254–257.
"The Sound Manager", *Inside MacIntosh*, vol. VI, Chapter 22, Jun. 1991, pp. 22–1 thru 22–114.
Jim Reekes, "Somewhere In Quicktime", *Develop*, Issue 16, Dec. 1993, pp. 34–38.
Jim Reekes & Tom Thompson, "MacIntosh Sound Revealed", *Byte*, Jul. 1991, pp. 249–250, 252, 254, 256, 258, 260, 262.

*Primary Examiner*—Ellis B. Ramirez
*Attorney, Agent, or Firm*—Helene Plotka Workman

[57] ABSTRACT

Briefly, a method and apparatus for mixing a plurality of channels of digital audio samples using a non-linear clipping function which has a variable scaling factor is disclosed. The non-linear curving function is capable of being graphically represented by a curve which is sloped at the edges before reaching the maximum values. In a first embodiment, the non-linear clipping function is applied to the samples and values are calculated in real-time. Preferably, inputs to the non-linear clipping function are modified depending upon any significant trends, e.g. increasing or decreasing, in the sums of samples over time. In a second embodiment, to reduce processor overhead, prior to real time application of the non-linear clipping function, the calculations are performed and a lookup table is generated. This lookup table is then used during real time to apply the clipping function to the input data so that the non-linear function is not recalculated whenever multiple channels are mixed. Lookup tables can be used in combination to apply the non-linear clipping function to a number of channels for which there is not a defined a look up table.

18 Claims, 7 Drawing Sheets

METHOD AND APPARATUS FOR MIXING MULTIPLE CHANNELS OF SAMPLED DIGITAL AUDIO USING A NON-LINEAR CLIPPING FUNCTION

RELATED APPLICATION

This application is related to co-pending application entitled "AN OBJECT-ORIENTED DIGITAL AUDIO SIGNAL PROCESSING METHOD AND APPARATUS", assigned Ser. No. 8/241,242 and filed concurrently on May 10, 1994, which was commonly assigned or subject to an obligation of assignment to the same person at the time of invention.

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

FIELD OF THE INVENTION

This invention relates generally to producing a sound from sampled digital audio and, more specifically, to a method and apparatus for mixing multiple channels of sampled digital audio.

BACKGROUND OF THE INVENTION

A mechanism which combines a plurality of digital audio signal data samples into a single digital audio signal data sample is typically called a "mixer". The definition of an audio sample is a value taken to record the amplitude at a given point of time. Digital audio has two aspects, a sampling rate and a value. Typically, the amplitude is recorded once every sampling period and that amplitude is stored as a value, generally an 8-bit or 16-bit resolution, known as the quantization factor. Herein, the value of a digital audio signal sample is regarded as its amplitude and the terminology of "summing" digital audio samples means to add together the amplitudes of those samples.

There are two common mixing methods used to combine the plurality of data samples: the sum and hard clip method and the sum, scale by a constant value and hard clip method. Hard clipping refers to a method for limiting the sum to the bit-size of the output by reducing sums which exceed a maximum value to that maximum value. Hard clipping generally produces a discontinuity that leads to high order and low order harmonics. Typically, high order harmonics are perceptibly distorted to the human ear.

In the sum and hard clip method, samples from the plurality of audio channels are summed together and then clipped if they overflow the size of the output sample. For example, in a situation where two data streams are being combined into a single data stream, each data stream having 8-bit samples, the two 8-bit samples from the data streams being combined are summed into a 16-bit value and then clipped to 8-bit resolution. The clipping of the sum generally produces distortion because the waveform of the original sound is not being accurately reproduced.

In the sum, scale by a constant value and hard clip method, an attempt is made to limit the distortion by scaling the sum of the samples by a constant value and then hard clipping if the result overflows the size of the output sample. However, the scaling of the sum typically results in a lowering of the amplitude, i.e. volume.

A sum, scale by a constant value and hard clip method is used in the Sound Manager 2.0, available as part of the Apple Macintosh operating system, version 6.0.7 and System 7, developed by Apple Computer, Inc. The Sound Manager 2.0 is described in "Inside Macintosh, Vol. VI, Chapter 22, Addison-Wesley Publishing Co., 1991. In that method, the samples being mixed are added together and then scaled by dividing the number of samples added. Using this method, an output sample is not greater than the maximum, but the amplitudes of each source are typically reduced. For example, if two channels are mixed, the amplitudes are averaged using this method which generally results in a lower overall amplitude. This method generally reduces the overall amplitude of the sound by 1/n, where n is the number of sources combined to produce the sound.

Depending on the scale factor, the sum, scale by a constant value and hard clip method may reduce distortion, but it also generally decreases the overall amplitude of the output stream considerably, resulting in loss of fidelity.

SUMMARY OF THE INVENTION

Briefly, according to the invention, multiple channels of sampled digital audio are mixed using a soft clipping function which is nonlinear. The invention uses a non-linear clipping function which has a variable scaling factor that provides virtually no distortion and amplitude loss, except when the signal is close to clipping. Since the channels of sound being mixed are often dissimilar and not in phase, the signal is rarely close to clipping. The non-linear clipping function is generally continuous, thereby producing low order harmonics which are perceptibly less distorted to the human ear than high order harmonics created using hard clipping.

Digital audio samples from one or more data streams are summed together and run through a non-linear clipping function, resulting in a single stream of output data. The non-linear clipping function is based on a curve in a graph having an x-axis representing the sum of the multiple samples and a y-axis representing the resulting sample value. The curve is linear in the middle at the zero crossing, i.e. silence, and sloped at the edges before reaching the maximum values, thereby avoiding, in most cases, the hard clipping which occurs when a linear clipping function is used.

The invention is an improvement over traditional sum, scale by a constant value and hard clip methods because it typically does not provide distortion except at the extreme ends of the bit resolution. Low-amplitude signals or signals not in phase with each other will incur virtually no distortion and no amplitude loss. In addition, if there is distortion, it is uniformly distributed across all sample values, instead of just those that exceed the clipping range, resulting in less obvious noise.

The invention can be applied to digital audio samples of any bit-size or orientation. In a first embodiment, the non-linear clipping function is applied to the samples and values are calculated in real-time. Preferably, inputs to the non-linear clipping function are modified depending upon any significant trends, e.g. increasing or decreasing, in the sums of samples over time.

In a second embodiment, to reduce processor overhead, prior to real time application of the non-linear clipping function, the calculations are performed and a lookup table is generated. This lookup table is then used during real time to apply the clipping function to the input data so that the non-linear function is not recalculated whenever multiple samples are mixed. Preferably, there is a unique lookup table, or section thereof, for each number of channels, e.g. 2 channels, 3 channels, 4 channels such that by changing the table used, any number of channels can be mixed using the same routine.

When a processor executing the non-linear clipping function has sufficient speed to perform such calculations in real-time with out significantly or perceptibly affecting performance, the first embodiment of the invention is preferably used to reduce data storage. Otherwise, the second embodiment is preferably used to increase the performance of the processor when applying the non-linear clipping function.

The invention provides several advantages. First, it allows for the mixing of multiple channels of audio without significant distortion or amplitude loss, in most cases. Second, depending on the processor, it provides efficient processing through use of table lookups. Third, the invention provides virtually no limit on the number of channels that can be mixed.

BRIEF DESCRIPTION OF THE DRAWINGS

The above and further advantages of the invention may be better understood by referring to the following description in conjunction with the accompanying drawings, in which.

DETAILED DESCRIPTION OF THE DRAWINGS

Figure 1:
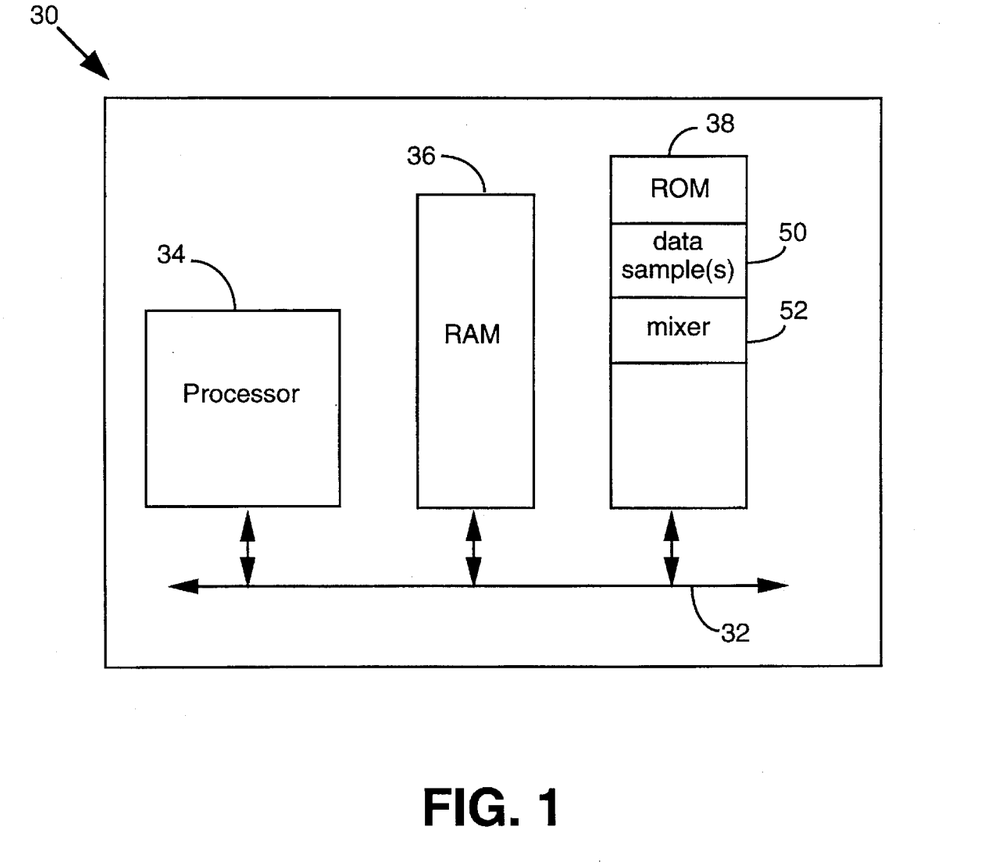
FIG. 1 is a simplified block diagram of a computer having a mixer capable of incorporating the invention.

FIG. 1 shows a computer 30 having a system bus 32 interconnecting a processor 34 and a random access memory 36 ("RAM") and a read only memory 38 ("ROM"). The processor 34 is typically a central processing unit ("CPU") or other microprocessor. The computer 30 may also include other non-volatile memory such as a hard disk (not shown). The computer also includes in ROM 38 data samples 50 and a mixer 52.

Figure 2:
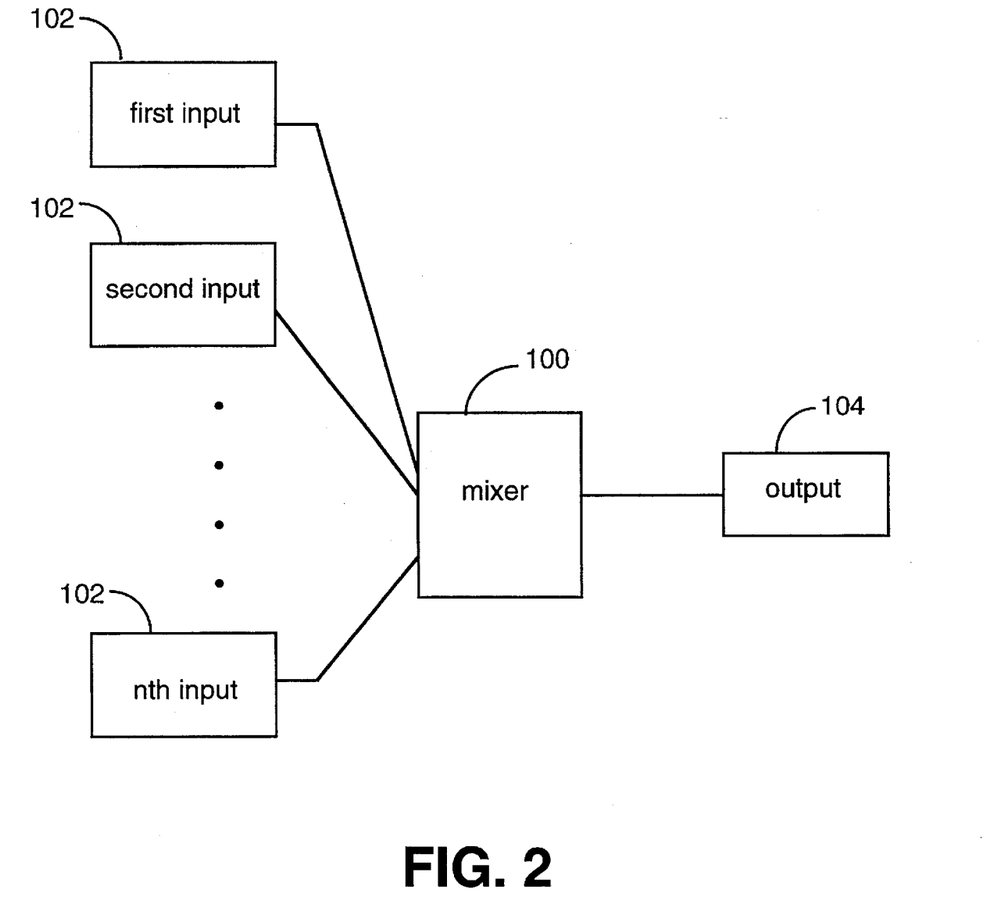
FIG. 2 illustrates a mixer of FIG. 1.

FIG. 2 illustrates a mixer incorporating the invention which accepts as input samples from one or more data streams, i.e. channels, mixes the samples together and outputs a single data stream. The invention is equally applicable to mixers which output multiple data streams. The mixer is typically located in ROM 38 or other storage medium (not shown) of the computer in FIG. 1 and if not stored in ROM is loaded into RAM 36 for execution. The mixer can be a stand-alone unit or it can be part of a digital audio signal processing system, such as, among others, the system described in a concurrently-filed and commonly-assigned patent application entitled, "An Object-oriented Digital Audio Signal Processing Method and Apparatus" of U.S. application Ser. No. 08/241,242, filed on May 10, 1994.

To mix samples from multiple streams of input the mixer in FIG. 2 sums the samples and uses an input based on the sum as an input to a non-linear clipping function. Among other representations and equations, the non-linear clipping function can be represented as follows:

$$X=(s/\text{max})/(n/\text{slope}) \quad Y=X/(1+|X|^\partial)^{1/\partial}$$

where the symbol "/" represents division, s is the summed sample value, $s_{max}$ is a maximum sample value, n is the number of streams summed together to form s, slope is a slope value and $\partial$ is a sharpness value. The above non-linear clipping function produces a family of curves based on slope and sharpness. Preferably, for 8-bit samples a sharpness of 6 and a slope of 2 are used.

The above-described representation of the function is designed for amplitudes represented in twos complement format. The function can be applied to other formats, such as off-set binary, by first converting to twos complement format, applying the function and then converting back to the original format.

The non-linear clipping function determines an X coordinate and then uses that value to determine a Y coordinate. The X coordinate is determined by dividing the sum of the samples by the maximum permissible sample value and dividing the result by the value of the number of streams summed together divided by a slope. The Y coordinate is calculated by raising the absolute value of the X coordinate to a power specified by the sharpness value, adding one to the result and then raising that result to a power specified by the reciprocal of the sharpness value and then finally dividing that result into the X coordinate.

The output of the above non-linear clipping function is preferably a signed value which can be scaled by $s$max to produce the mixed sample value. The output of the above-described non-linear clipping function (FIG. 3) is graphically represented in FIG. 4.

Figure 4:
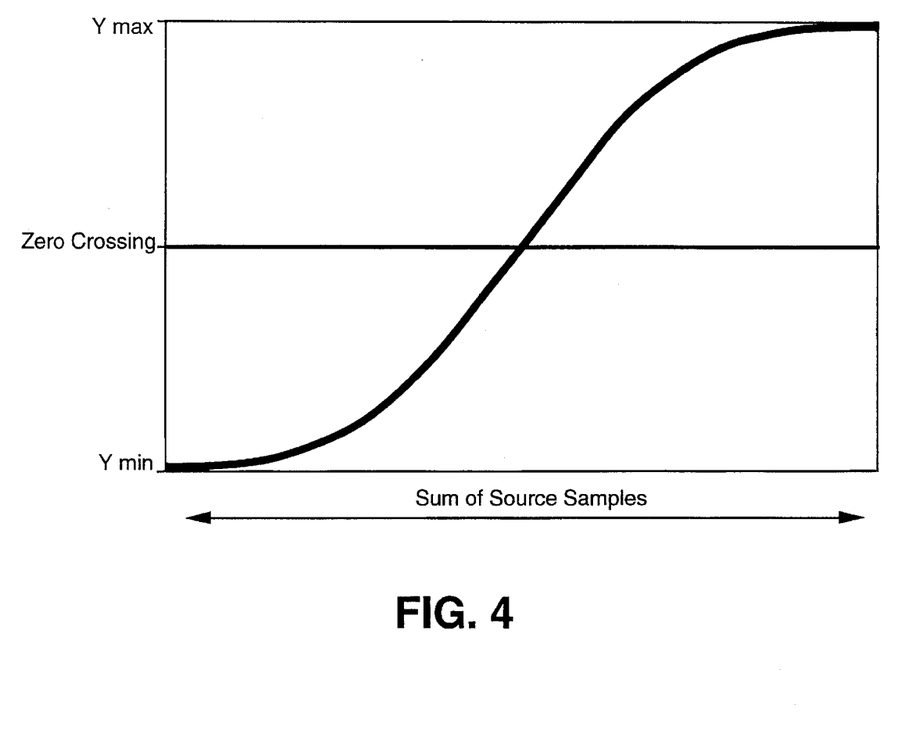
FIG. 4 is a graphical representation of output from the non-linear clipping function of FIG. 3.

The slope parameter to the non-linear clipping function determines the basic slope of the line in FIG. 4. The sharpness value used in the non-linear clipping function determines how fast it rolls off as the function nears the clipping boundary, e.g. the curved portions at the top and bottom of the graph. Unlike in a sum and hard clip method where a graphical representation yields a line which is linearly-sloped and horizontal at the edges and unlike in a sum, scale by a constant value and hard clip method where a graphical representation yields a linear line, the non-linear clipping function of the invention yields a curve which slowly curves off the clipping at the extremes, thereby producing soft clipping which reduces distortion.

In FIG. 4, the vertical axis is bounded by $Y_{min}$ and $Y_{max}$ where $Y_{max}$ is the largest signed value that can be represented in the bit-size of the output sample and $Y_{min}$ is the smallest signed value that can be represented in the bit-size of the output sample.

To generally avoid clipping, the graph is sloped at the edges before reaching the maximum values. When mixing samples it is unlikely that the sum will be greater than the maximum. Thus, the invention provides a method which minimizes distortion and such distortion is unlikely to occur except when the samples are exactly in phase for an extended number of cycles. This situation is typically rare, e.g. when 2 sine waves are played perfectly in phase.

Figure 3:
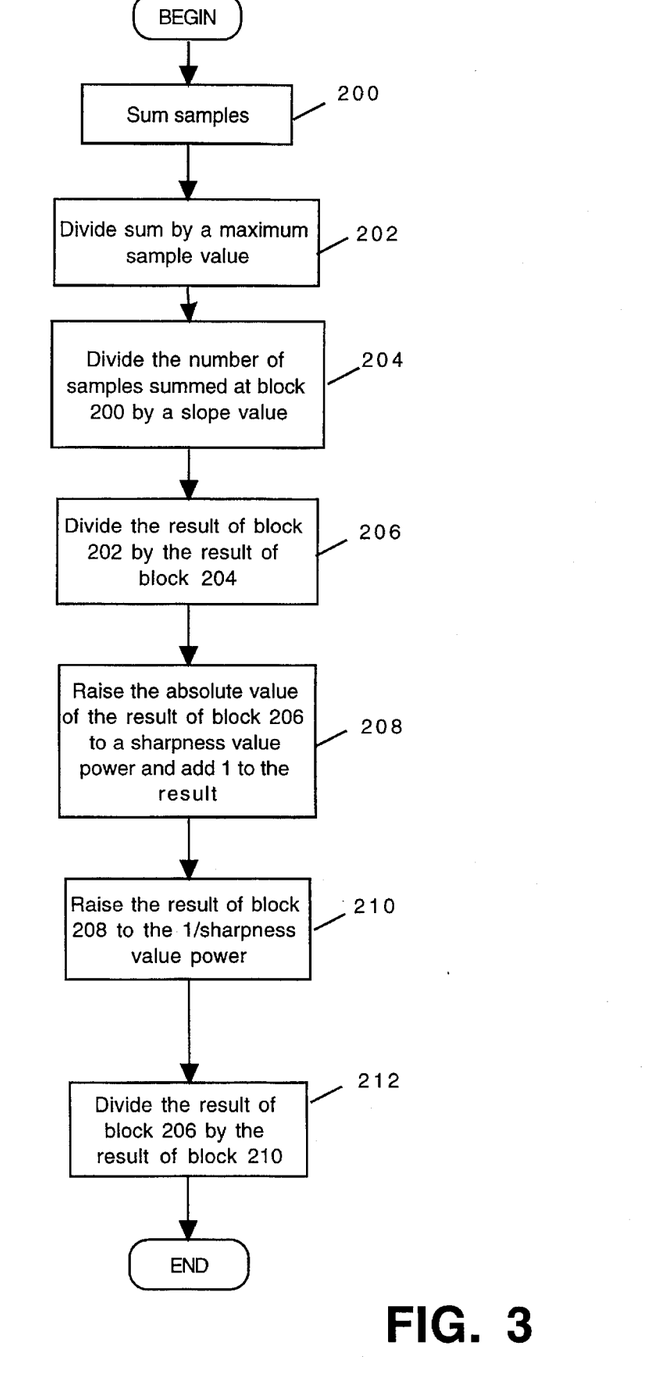
FIG. 3 is a flowchart generally depicting steps performed during an application of a non-linear clipping function of the invention.

In a first embodiment of the invention, the calculations of the non-linear function of FIG. 3 are performed on samples in real time as they are mixed. Preferably, a running average of the sums of the samples is maintained so that the input values to the non-linear clipping function, such as sharpness, can be modified to minimize distortion. When the sums are decreasing and are in a small range, it is desirable to increase sharpness so that the curve is more linear in that area. When the sums are increasing and near an area where clipping can occur, it is desirable to decrease sharpness so that any distortion that does occur is distributed over a wider area and therefore, less noticeable.

Figure 5A:
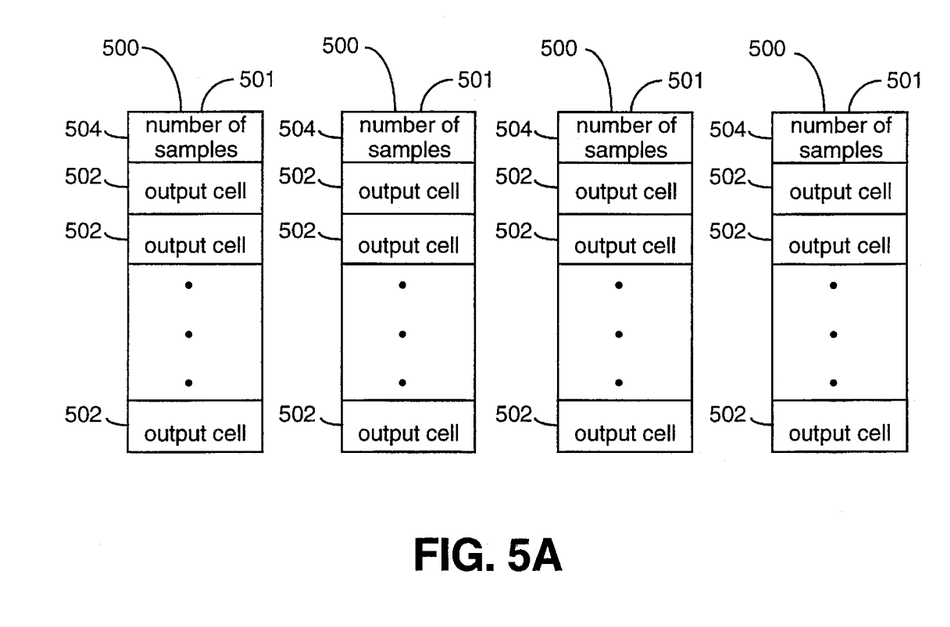
FIG. 5A shows a plurality of lookup tables for determining an output of a non-linear clipping function of FIG. 3.
Figure 5B:
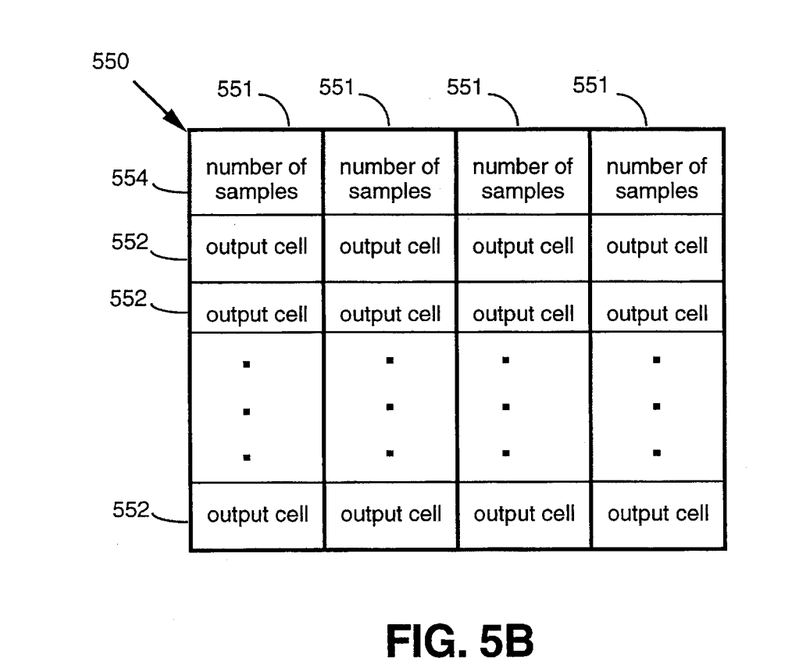
FIG. 5B shows a multi-dimensional lookup table for determining an output of a non-linear clipping function of FIG. 3.

In a second embodiment of the invention, processor overhead during mixing is generally reduced by pre-computing the non-linear clipping function of FIG. 3 for all values of s at a particular sharpness and slope and storing the results in one or more lookup tables, as shown in FIGS. 5A and 5B. The lookup table is generally stored in ROM (FIG. 1). The lookup table is typically used to quickly and efficiently generate an output value during mixing.

The one or more lookup tables provide a mechanism for determining an output value for the non-linear function given a particular number of channels. A lookup table contains a plurality of output cells arranged in segments wherein the output cells of a particular segment pertain to the same number of channels. For example, the output cells for a number of channels being mixed equal to four are in the same segment and the output cells for a number of channels being mixed equal to three are in the same segment as each other, but in a different segment than the output cells for four channels.

FIGS. 5A and 5B illustrate two possible configurations, although a variety of other configurations are possible. FIG. 5A illustrates a configuration in which a look up table is one-dimensional, i.e. it has a single segment, thereby providing output values for a single particular number of channels. FIG. 5B shows a configuration in which a look up table is multi-dimensional containing a plurality of segments, thereby containing output values for a plurality of numbers of channels. Typically, the size of a lookup table of FIG. 5A or a segment of FIG. 5B is $2^m$ times n, where m is the bit size of digital samples and n is the number of channels.

In FIG. 5A a lookup table 500 has a single segment 501 containing a plurality of output cells 502 arranged so that the sum of the samples can be used to reference the value stored within the appropriate output cell. Optionally, a lookup table 500 also includes a number of channels indicator 504 for specifying the number of channels to which the lookup table applies. Rather than having a number of channels indicator 405, other mechanisms can be used to determine which look up table applies to the number of channels being mixed. For example, the name of the lookup table can specify the number of channels. As shown in FIG. 5A, there can be a plurality of lookup tables, each preferably for a different number of channels. Preferably, for 8-bit samples, there are three lookup tables 500, one for two channels, one for three channels, and one for four channels.

In a first embodiment of a lookup table 500, there is virtually one output cell for each valid sum of the samples. For example, in a lookup table for n channels, where a valid value for each sample lies in the range of $Y_{min}$ to $Y_{max}$, inclusive (FIG. 4), there is an output cell for each sum in the range $n * Y_{min}$ to $n * Y_{max}$, inclusive. The sum of the samples is used to find an appropriate output cell value in the lookup table for the number of channels summed. For example, if the lookup table is an array, the sum can be used as an index into the array.

In a second embodiment of a lookup table 500, since the last half of a lookup table is typically an inverse of the first half because the table is symmetric, the size of the lookup table can be reduced, virtually by half. In this case the lookup table contains output cells for either all the valid sums between 0 and $n * |Y_{min}|$, inclusive or all the valid sums between $n * Y_{min}$ and 0, inclusive, where n is the number of channels, $Y_{min}$ is defined in conjunction with FIG. 4 and the notation $|Y_{min}|$ is used to denote an absolute value of $Y_{min}$. To access an output cell in the lookup table it may be necessary to invert the sign of the sums to correspond with the domain of the table. For example, if the table contains positive values, then negative sums are converted to positive and then used to lookup an output cell value. The output cell value is then negated to produce the proper output value.

Alternatively, as shown in FIG. 5B, a lookup table can be multidimensional, containing a plurality of segments and thereby containing outputs for a plurality of number of channels. The lookup table can be arranged so that segments correspond to rows or to columns in the lookup table. In FIG. 5B each column is a separate segment.

A lookup table 550 contains a plurality of segments 551, each segment containing a plurality of output cells 552, similar to the lookup table 500, segment 501 and output cells 502 of FIG. 5B. For descriptive purposes, the segments 551 are highlighted. The lookup table 500 also includes a mechanism for locating the proper output cell based on the number of channels and the summed sample value. This mechanism can include a number of channels indicator 554, similar to the number of channels indicator 504 of FIG. 5A, for each segment of the lookup table. Alternatively, the lookup table can be arranged so that the number of channels can be used as an index into the table to determine the segment having the output cells 552 for that number of samples. The sum of the samples is then used to determine which output cell for that number of samples contains the appropriate value. A lookup table 550 can also be implemented according to the second embodiment described in conjunction with FIG. 5A. Essentially, the lookup table 500 of FIG. 5A can be considered a lookup table 550 of FIG. 5B having a single segment and thus for a lookup table having a single segment the terms segment and lookup table are interchangeable.

As previously mentioned the output cell values can be expressed in formats other than twos-complement. For example, the output values can be expressed in an offset-binary representation wherein the values are unsigned. In an 8-bit offset-binary representation the zero crossing is represented by value 128. A binary-offset representation is typically used in a Sound Manager 2.0 of a Macintosh operating system, version 7.1, developed by Apple Computer and described in the "Inside Macintosh", Vol. VI, Chapter 22, Addison-Wesley Publishing Co., 1991. As previously discussed, the invention is generally applicable to any amplitude scale representation and depending on the implementation the location of the curve in FIG. 4 might change, but the overall shape remains substantially the same.

Appendix A lists some code for a routine which generates values for a lookup table of FIG. 5A or for a segment of a lookup table of FIG. 5B for 8-bit audio samples. The routine is written in the C programming language and is designed for audio samples in an offset-binary format. The routine converts the sums of the samples into twos-complement format, applies the non-linear function described above with respect to FIG. 3, and then converts the result into offset-binary format. Given a reference to a lookup table, a number of channels, a sharpness and a slope, the routine generates output values for the virtually each of the possible sums of the samples.

Lookup tables, including those shown in FIGS. 5A and 5B, can be used to determine output values for a number of channels for which there is no predefined lookup table. This is accomplished by using a combination of existing lookup tables on subsets of the number of channels in an order which ultimately results in a single output value.

For example, in a configuration as shown in FIG. 5A where there are three lookup tables 500, one for two channels, one for three channels and one for four channels, an output value for five channels can be attained in the following manner. The lookup table for four channels is used to attain an output value for four of the channels. That output value and the fifth channel are summed and used to reference an output value in the lookup table for two channels. The resulting output value is the mixed sample.

Figure 6:
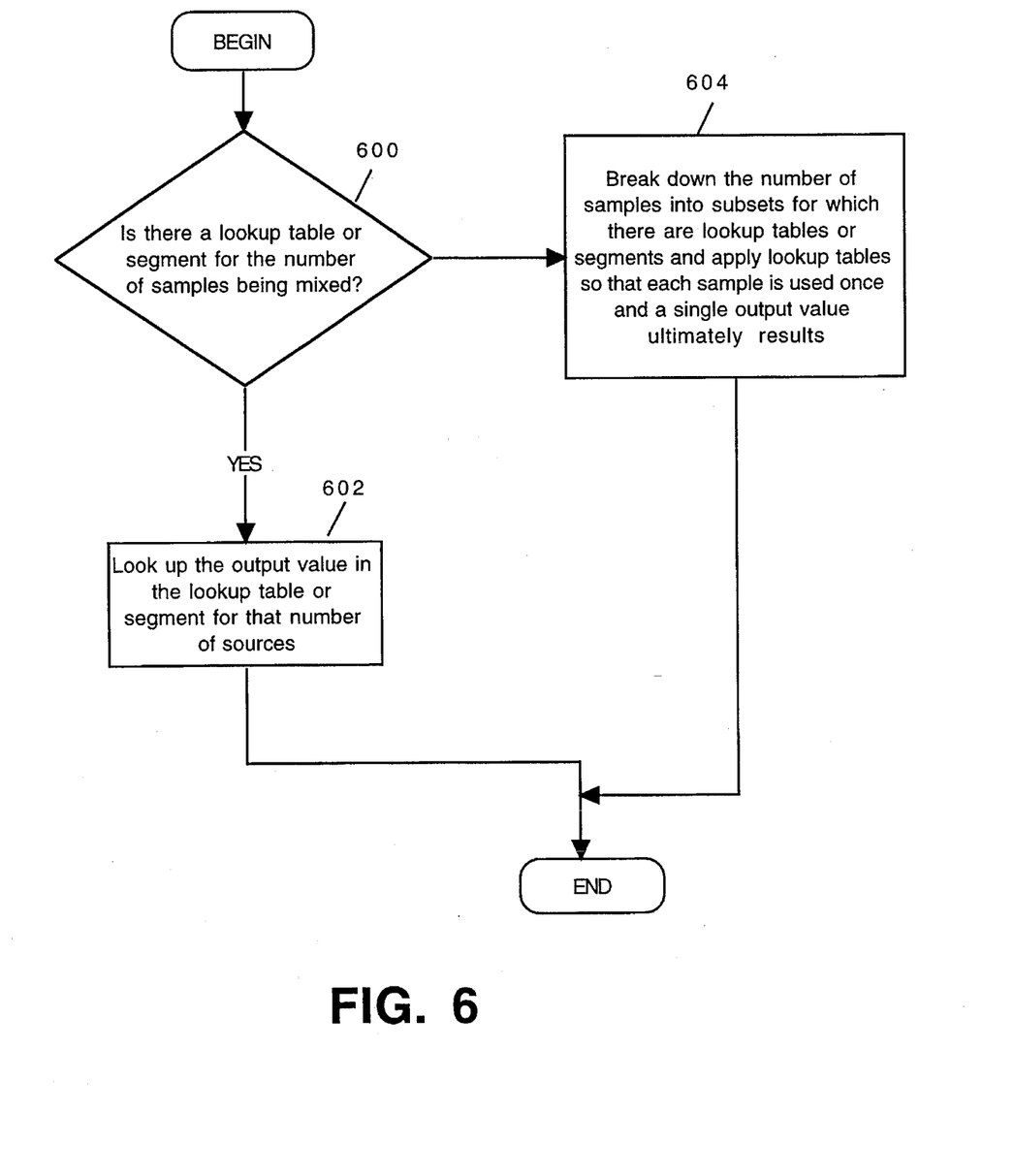
FIG. 6 is a flowchart depicting the steps performed when mixing a plurality of digital audio samples.

FIG. 6 is a flowchart generally illustrating the use of lookup tables to determine an output value for applying the non-linear clipping function to mix a particular number of channels. At block 600, a determination is made as to whether there is a look up table or segment thereof for the number of channels being mixed. If so, then at block 602 the output value is determined using the lookup table or segment identified at block 600. As previously discussed, depending on the implementation of the lookup table, a sum of the values or a negation of the sum is used to locate the output cell containing an appropriate output value. If there is not a look up table, then at block 604 the channels are mixed using a combination of existing look up tables.

Figure 7:
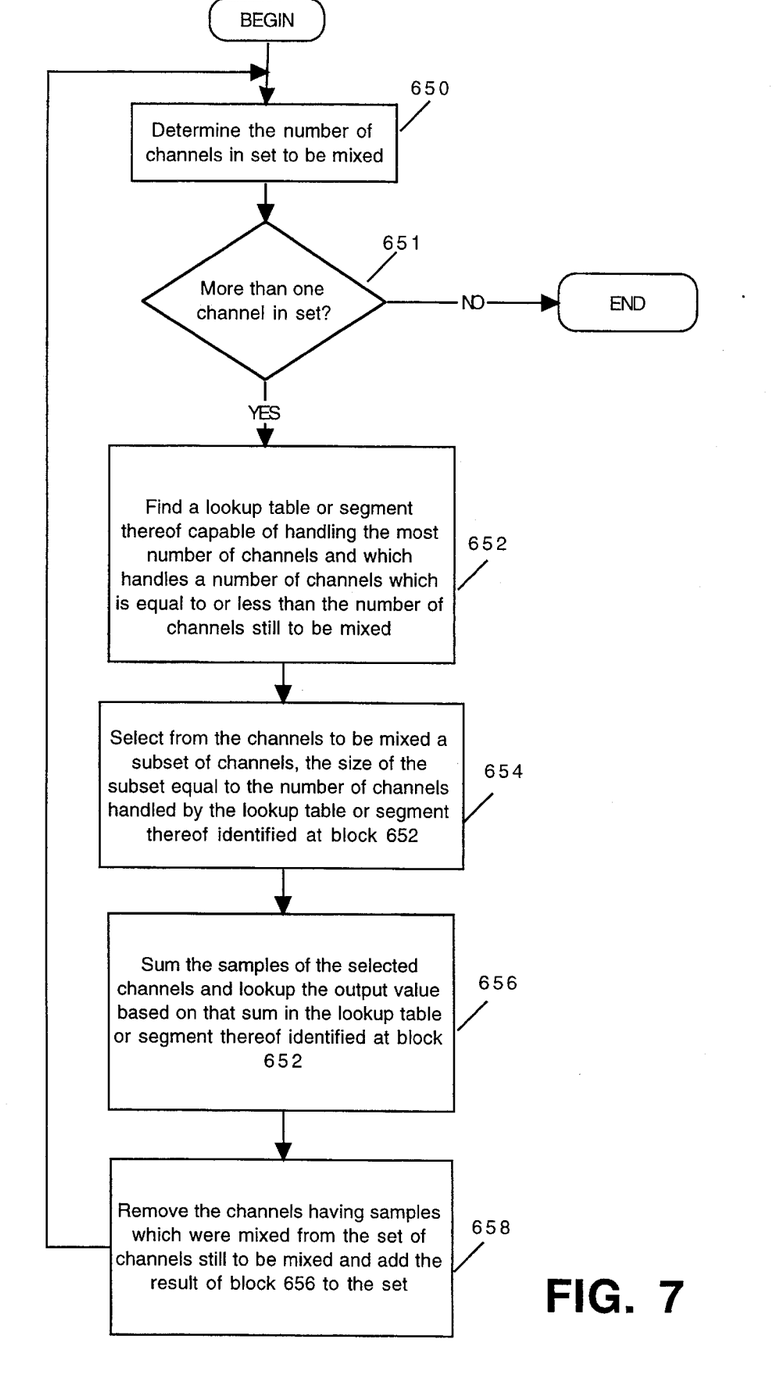
FIG. 7 is a flowchart depicting the steps performed at block 604 of FIG. 6.

FIG. 7 is a flowchart depicting steps performed at block 604 of FIG. 6. At block 650, it is determined how many channels are being mixed. In a situation where that value is already "known", block 650 can be skipped. At block 651, if there is only one channel in the set, i.e. there are no more mixing operations to perform, then control returns to FIG. 6. If there is more than one channel in the set, then at block 652, a lookup table or segment is located which can handle the largest number of channels without exceeding the number of channels in the set. For example, if there are three lookup tables, one for two channels, one for three channels, and one for seven channels and the number of channels in the set is four, the lookup table for three channels, rather than the one for seven channels, is used.

At block 654, a subset of channels from the set is selected such that the size of the subset is equal to the number of channels handled by the lookup table or segment identified at block 652. The samples of the channels in this subset are summed at block 656 and the sum used to determine an output value for the non-linear clipping function using the lookup table identified at block 652. In a second embodiment of an implementation of the lookup table, as discussed in conjunction with FIG. 5, if the sum is greater than 2 times the midpoint, the inverse of the sum is used to determine an output value for the non-linear clipping function using the lookup table identified at block 652.

At block 658, the channels having samples which were summed at block 656 are removed from the set of channels to be mixed and the output value determined at block 656 is added to the set. Control then returns to block 650 where the number of channels is determined if it is not already "known". In the previous example, after a lookup table for three channels is used on three of the four channels at block 56 and those channels are removed from the set and the output value of block 656 is added to the set, the number of channels determined at block 650 is two. In that case, at block 656 a lookup table for two channels is used to complete the mixing operation.

The foregoing description has been limited to a specific embodiment of this invention. It will be apparent, however, that variations and modifications may be made to the invention with the attainment of some or all of its advantages. Therefore, it is the object of the appended claims to cover all such variations and modifications as come within the true spirit and scope of the invention.

---

APPENDIX A

---

```
void BuildMixTable(MixTablePtr table, short numChannels, float clipSharpness)
{
    short    i;
    float    x;
    float    y;
    float    z;
    float    zz;
    float    zzz;
    float    zzzz;
    for (i = 0; i < 256 * numChannels; i++) {
        x = (i - 128. * numChannels) / 128.;
        z = fabs(x);
        zz = power(z, clipSharpness);
        zzz = 1. / clipSharpness;
        zzzz = power(1. + z, zzz);
        y = x / zzzz;
        table[i] = 128 + 128 * y;
    }
}
```

---

We claim:

1. A method for mixing a plurality of channels of digital audio samples into a single channel of digital audio samples on a computer having a processor and a storage, said method comprising:

adding together digital audio samples from a plurality of channels to form a sum;

converting the sum to a resulting digital audio signal using a non-linear clipping function; and storing the resulting digital audio signal in the storage.

2. A method as defined in claim 1 wherein the non-linear clipping function is capable of being represented by a curve in a graph having a y-axis for resulting digital audio signals and an x-axis for the sum of the samples, where the curve is sloped at the edges before reaching a minimum and maximum value.

3. A method as defined in claim 1 wherein the step of converting the sum to a resulting digital audio signal using a non-linear clipping function is performed by calculating an output value for the non-linear function in real-time.

4. A method as defined in claim 1 wherein the step of converting the sum to resulting digital audio signal using a non-linear clipping function comprises the steps of:

dividing the sum by a maximum sample value to form a first result;

dividing a number of samples added together to form the sum by a slope value to form a second result;

dividing the first result by the second result to form a third result;

raising an absolute value of the third result to a power specified by a sharpness value and adding 1 to form a fourth result;

raising the fourth result to a power specified by an inverse of the sharpness value to form a fifth result; and dividing the third result by the fifth result.

5. A method for mixing a plurality of channels of digital audio samples into a single channel of digital audio samples on a computer having a processor, a storage and one or more lookup tables in the storage, each table having one or more segments wherein each segment has a plurality of output cells, each segment associated with a particular number of samples, said method comprising:

for one or more number of channels, performing the following steps:
for a plurality of possible sums of the samples, determining an output value for each of the sums in the plurality by applying a non-linear clipping function to the sum and storing the output value in an output cell of a lookup table such that the sum can be used to access the output value;

identifying a segment of a lookup table for a number of samples being mixed;

adding together a plurality of samples to be mixed;

determining an output value for a non-linear clipping function; and storing the output value in the storage.

6. A method as defined in claim 5, wherein the step of determining an output value for a non-linear function is performed by using the sum to look up the output value in the identified lookup table.

7. A method as defined in claim 5 wherein the step of determining an output value for a non-linear function is performed by if the sum is positive or zero then use the sum to look up the output value in the lookup table; and if the sum is negative then
negate the sum,
use the result to look up an output value in the lookup table, and
negate the output value.

8. A method as defined in claim 5 wherein the step of determining an output value for a non-linear function is performed by if the sum is negative or zero then use the sum to look up the output value in the lookup table; and if the sum is positive then
negate the sum,
use the result to look up an output value in the lookup table, and
negate the output value.

9. A method for mixing a plurality of digital audio samples into a single digital audio sample on a computer having a processor, a storage and one or more lookup tables in the storage, each table having one or more segments wherein each segment has a plurality of output cells, each segment associated with a particular number of samples, said method comprising:

for one or more number of channels, performing the following steps:
for a plurality of possible sums of the samples, determining an output value for each of the sums in the plurality by applying a non-linear clipping function to the sum and storing the output value in an output cell of a lookup table such that the sum can be used to access the output value;

performing one or more repetitions of the following sequence of steps until the set does not contain a plurality of channels to be mixed:
determining a number of channels in a set of channels to mix;

if a lookup table exists for that number of channels, then determining an output value for that sum by using the sum to look up the output value in a lookup table, if a lookup table does not exist for that number of channels, then
determining which lookup tables handle a number of channels less than the number of channels and, of those, identifying the lookup table which handles the largest number of channels,
selecting a subset of the set of channels to mix such that the size of the subset is equal to the number of channels handled by the identified lookup table,
adding together the channels in the subset,
determining an output value for a non-linear clipping function by using the sum of the channels in the subset to look up the output value in the identified lookup table,
removing the channels in the subset from the set of samples to be mixed,
adding the determined output value to the set of channels to be mixed; and storing the output value in the storage.

10. An apparatus for mixing a plurality of channels of digital audio samples into a single channel of digital audio sample on a computer, said apparatus comprising:

a processor;

a storage connected to said processor;

a plurality of digital audio samples, stored in said storage and capable of being accessed from said storage; and a mixer for mixing digital audio samples from a plurality of channels into a single channel of digital audio sample by summing together the digital audio samples of the plurality of channels and applying a non-linear clipping function to the sum.

11. An apparatus for mixing a plurality of channels of digital audio samples into a single channel of digital audio sample on a computer, said apparatus comprising:

a processor;

a storage connected to said processor;

a plurality of digital audio samples, stored in said storage and capable of being accessed from said storage;

at least one lookup table, said lookup table having at least one segment, said segment having a plurality of output cells for storing output values from a non-linear clipping function, the output cells of a segment being related in that the output values stored therein are derived using the same number of channels as input to the non-linear clipping function; and a mixer for mixing digital audio samples of the plurality of channels into a single channel of digital audio sample by summing the digital audio samples of the plurality of channels and applying a non-linear clipping function to the sum by using the sum to reference an output value in an output cell in a segment of a lookup table, said segment having output cells for the number of channels which were summed.

12. A method for creating one or more lookup tables for use in mixing a plurality of channels of digital audio samples into a single channel of digital audio samples on a computer having a processor, a storage, each lookup table having a plurality of output cells, said method comprising:

for one or more number of channels, performing the following steps:

for a plurality of possible sums of the samples, determining an output value for each of the sums in the plurality by applying a non-linear clipping function to the sum and storing the output value in an output cell of a lookup table such that the sum can be used to access the output value.

13. A method as defined in claim 12, wherein said output cells in said lookup table are arranged in one or more segments such that output cells for a particular number of samples are in the same segment.

14. A method for mixing a plurality of digital audio samples into a single digital audio sample on a computer having a processor, a storage and one or more lookup tables in the storage, each table having one or more segments wherein each segment has a plurality of output cells, each segment associated with a particular number of samples, said method comprising:

for one or more number of channels, performing the following steps:
for a plurality of possible sums of the samples, determining an output value for each of the sums in the plurality by applying a non-linear clipping function to the sum and storing the output value in an output cell of a lookup table such that the sum can be used to access the output value;
performing one or more repetitions of the following sequence of steps until the set does not contain a plurality of channels to be mixed:
determining a number of channels in a set of channels to mix,
if a lookup table exists for that number of channels, then determining an output value for that sum by using the sum to look up the output value in a lookup table,
if a lookup table does not exist for that number of channels, then
determining which lookup tables handle a number of channels less than the number of channels and selecting one of the determined lookup tables;
selecting a subset of the set of channels to mix such that the size of the subset is equal to the number of channels handled by the selected lookup table,
adding together the channels in the subset,
determining an output value for a non-linear clipping function by using the sum of the channels in the subset to look up the output value in the selected lookup table,
removing the channels in the subset from the set of samples to be mixed,
adding the determined output value to the set of channels to be mixed; and
storing the output value in the storage.

15. An apparatus for mixing a plurality of channels of digital audio samples into a single channel of digital audio sample on a computer, said apparatus having a processor and a storage connected to the processor, said apparatus comprising:

a plurality of digital audio samples, stored in said storage and capable of being accessed from said storage; and a mixer for mixing digital audio samples from a plurality of channels into a single channel of digital audio sample by summing together the digital audio samples of the plurality of channels and applying a non-linear clipping function to the sum.

16. An apparatus for mixing a plurality of channels of digital audio samples into a single channel of digital audio sample on a computer, said apparatus having a processor and a storage connected to the processor, said apparatus comprising:

a plurality of digital audio samples, stored in said storage and capable of being accessed from said storage;

at least one lookup table, said lookup table having at least one segment, said segment having a plurality of output cells for storing output values from a non-linear clipping function, the output cells of a segment being related in that the output values stored therein are derived using the same number of channels as input to the non-linear clipping function; and a mixer for mixing digital audio samples of the plurality of channels into a single channel of digital audio sample by summing the digital audio samples of the plurality of channels and applying a non-linear clipping function to the sum by using the sum to reference an output value in an output cell in a segment of a lookup table, said segment having output cells for the number of channels which were summed.

17. An apparatus for mixing a plurality of channels of digital audio samples into a single channel of digital audio sample on a computer, said apparatus having a processor and a storage connected to the processor, said apparatus comprising:

a plurality of digital audio samples, stored in said storage and capable of being accessed from said storage;

at least one lookup table, said lookup table having a plurality of output cells for storing output values from a non-linear clipping function; and a mixer for mixing digital audio samples of the plurality of channels into a single channel of digital audio sample by summing the digital audio samples of the plurality of channels and applying a non-linear clipping function to the stun by using the sum to reference an output value in an output cell in a lookup table.

18. An apparatus as defined in claim 17, wherein the output cells of a lookup table are arranged into one or more segments such that the output cells within a segment store an output value derived by applying the nonlinear clipping function to the sum of samples from the same number of channels.

* * * * *